(12) United States Patent
Chernoff et al.

(10) Patent No.: US 7,258,188 B2
(45) Date of Patent: Aug. 21, 2007

(54) VARIABLE SEAT BELT

(75) Inventors: Adrian B. Chernoff, Troy, MI (US); Kristin B. Zimmerman, New Baltimore, MI (US)

(73) Assignee: General Motors Corporation, Detroit, MI (US)

( * ) Notice: Subject to any disclaimer, the term of this patent is extended or adjusted under 35 U.S.C. 154(b) by 436 days.

(21) Appl. No.: 10/830,156

(22) Filed: Apr. 22, 2004

(65) Prior Publication Data

US 2005/0236209 A1  Oct. 27, 2005

(51) Int. Cl.
*B60R 22/00* (2006.01)

(52) U.S. Cl. .................. 180/268; 280/801.1; 280/806; 297/480

(58) Field of Classification Search ................ 280/806; 297/480, 473, 488; 180/268
See application file for complete search history.

(56) References Cited

U.S. PATENT DOCUMENTS

| | | | |
|---|---|---|---|
| 3,146,460 A | 9/1964 | Henderson .................... 2/455 |
| 3,218,103 A | 11/1965 | Boyce ........................ 297/466 |
| 3,430,979 A | 3/1969 | Terry et al. ................. 280/733 |
| 3,499,681 A * | 3/1970 | O'Neal ....................... 297/465 |
| 3,560,048 A * | 2/1971 | Flint .......................... 297/465 |
| 3,827,716 A | 8/1974 | Vaughn et al. .............. 280/150 |
| 3,841,654 A * | 10/1974 | Lewis ......................... 280/733 |
| 3,865,398 A | 2/1975 | Woll ..................... 280/150 AB |
| 3,866,940 A | 2/1975 | Lewis ......................... 280/150 |
| 3,888,503 A | 6/1975 | Hamilton .................... 280/150 |
| 3,905,615 A | 9/1975 | Schulman ................... 280/150 |
| 3,948,541 A | 4/1976 | Schulman ................... 280/150 |
| 3,953,049 A | 4/1976 | Surace et al. ............... 280/730 |
| 3,953,640 A | 4/1976 | Takada ....................... 428/188 |
| 4,437,628 A | 3/1984 | Schwartz .................... 244/122 |
| 4,508,294 A | 4/1985 | Lorch ......................... 244/122 |
| 5,282,648 A | 2/1994 | Peterson .................... 280/733 |
| 5,393,091 A * | 2/1995 | Tanaka et al. ............. 280/733 |
| 5,839,753 A * | 11/1998 | Yaniv et al. ................ 280/733 |
| 6,135,563 A | 10/2000 | Yoshioka .................... 297/470 |
| 6,237,945 B1 | 5/2001 | Aboud et al. ............... 280/733 |
| 6,439,601 B1 * | 8/2002 | Iseki ........................... 280/733 |
| 6,572,148 B2 * | 6/2003 | Wittenberg ................. 280/808 |
| 6,581,968 B1 * | 6/2003 | Grace et al. .............. 280/801.1 |
| 6,598,899 B2 * | 7/2003 | Stonich et al. ............. 280/733 |
| 6,805,380 B2 * | 10/2004 | Namiki ..................... 280/801.1 |
| 6,911,764 B2 * | 6/2005 | Pelrine et al. .............. 310/328 |
| 2004/0036345 A1 | 2/2004 | Herberg et al. ............. 297/480 |
| 2005/0067826 A1 * | 3/2005 | McFalls et al. .......... 280/801.1 |

FOREIGN PATENT DOCUMENTS

| DE | 101 14 392 A1 | | 10/2002 |
| JP | 03079448 A | * | 4/1991 |
| JP | 06025936 A | * | 2/1994 |

* cited by examiner

*Primary Examiner*—Paul N. Dickson
*Assistant Examiner*—Timothy D. Wilhelm

(57) ABSTRACT

A seat belt system includes webbing having a solid material that is configured to effect a shape or dimensional change in response to an activation signal. In a preferred embodiment, the webbing includes a first part and a second part, each having a wide end and a narrow end. The webbing is mounted with respect to a vehicle seatback so that the webbing is positionable across an occupant between the occupant's neck and the occupant's pelvis, and is characterized by the absence of an over-the-shoulder portion.

15 Claims, 3 Drawing Sheets

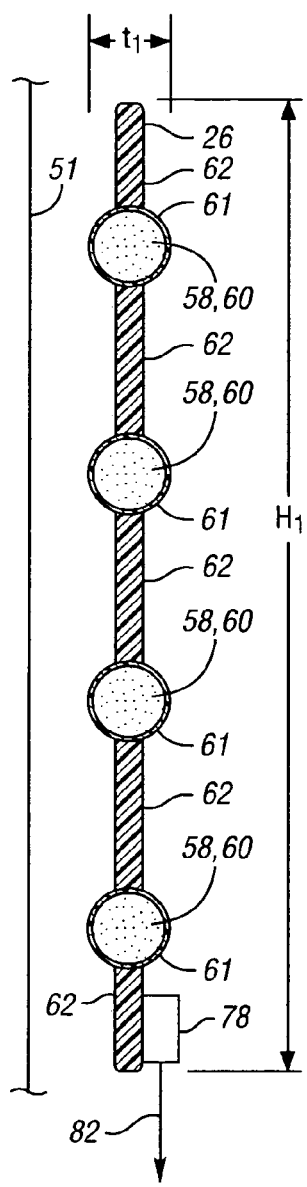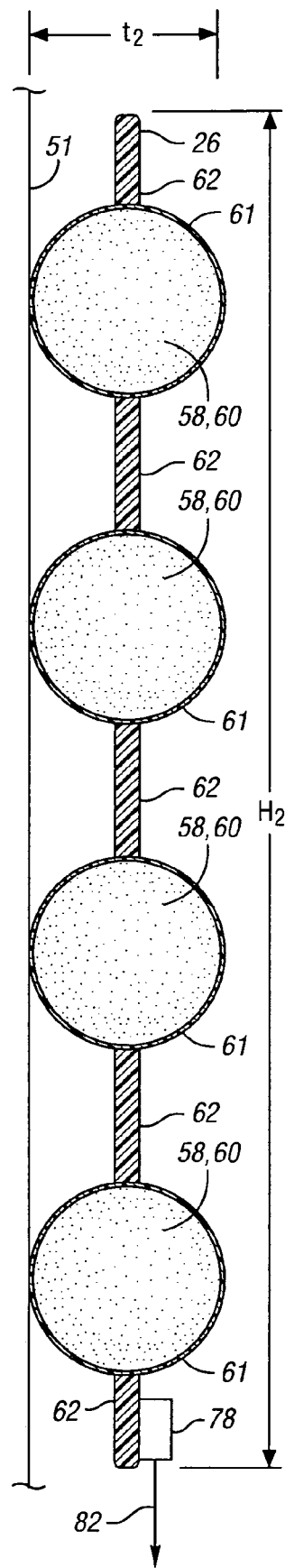
FIG. 3
FIG. 5

VARIABLE SEAT BELT

TECHNICAL FIELD

This invention relates to vehicle seat belts that include a material that is configured to vary in size and shape in response to an activation signal.

BACKGROUND OF THE INVENTION

Prior art vehicles typically include seat belts. Seat belts in use in most passenger vehicles are three point seat belts, with webbing that forms a lap belt portion and a shoulder belt portion.

SUMMARY OF THE INVENTION

A seat belt system for use by an occupant of a vehicle seat is provided. The seat belt system includes seat belt webbing that has a solid material sufficiently configured to selectively effect a shape or dimensional change in the webbing in response to activation signals. The dimensional change may include an increase in webbing thickness so that the webbing acts as a pretensioner, reducing any gap that may exist between the belt and the occupant. The dimensional change may also result in an increased surface area in contact with the occupant. The solid material is preferably a shape memory material or a contractile polymer that exhibits abrupt volume changes in response to variations in external conditions, such as mechanical, chemical or electrical stimuli.

In an exemplary embodiment, the webbing includes a first segment and a second segment, each having a wide end and a narrow end. The first segment includes a buckle and the second segment includes a tongue member, and the first segment and the second segment are sufficiently configured so that when the buckle and the tongue member are engaged with one another, the webbing is positioned across the occupant between the occupant's neck and the occupant's pelvis. The action of the webbing on the occupant is thus similar to hands holding an infant.

A method is also provided that includes monitoring a state or condition, and causing the size of seat belt webbing to change in response to a change in the monitored state or condition. Thus, the size of the seat belt is variable to accommodate, or compensate for, changes in vehicle conditions such as vehicle acceleration, occupant size, occupant position with respect to a vehicle seat, force exerted by an occupant against the seat belt webbing, etc.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic cross sectional view of the seat belt in the contracted condition taken along a vertical plane;

FIG. 5 is a schematic cross sectional view of the seat belt in the expanded condition taken along the same vertical plane as FIG. 3.

DESCRIPTION OF THE PREFERRED EMBODIMENTS

Figure 1:
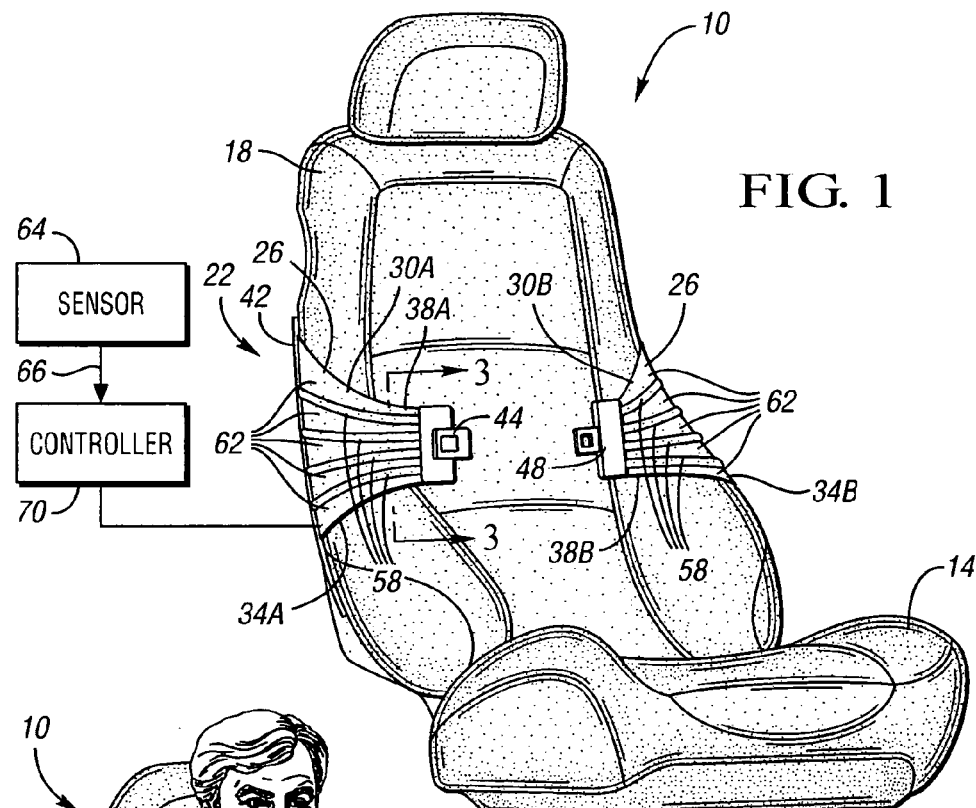
FIG. 1 is a schematic perspective view of a vehicle seat and a seat belt system.

Referring to FIG. 1, a vehicle seat 10 includes a lower seat portion 14 and a seatback portion 18. A seat belt system 22 includes webbing 26. The webbing 26 includes a first segment 30A and a second segment 30B. Each segment 30A-B of webbing is tapered to include a wide end 34A, 34B and a narrow end 38A, 38B. Wide end 34A of segment 30A is mounted to one side of the seatback portion 18 by a track 42 so that segment 30A is selectively vertically adjustable. Similarly, wide end 34B of segment 30B is mounted to the other side of the seatback portion 18 by another track so that segment 30B is selectively vertically adjustable.

Figure 2:
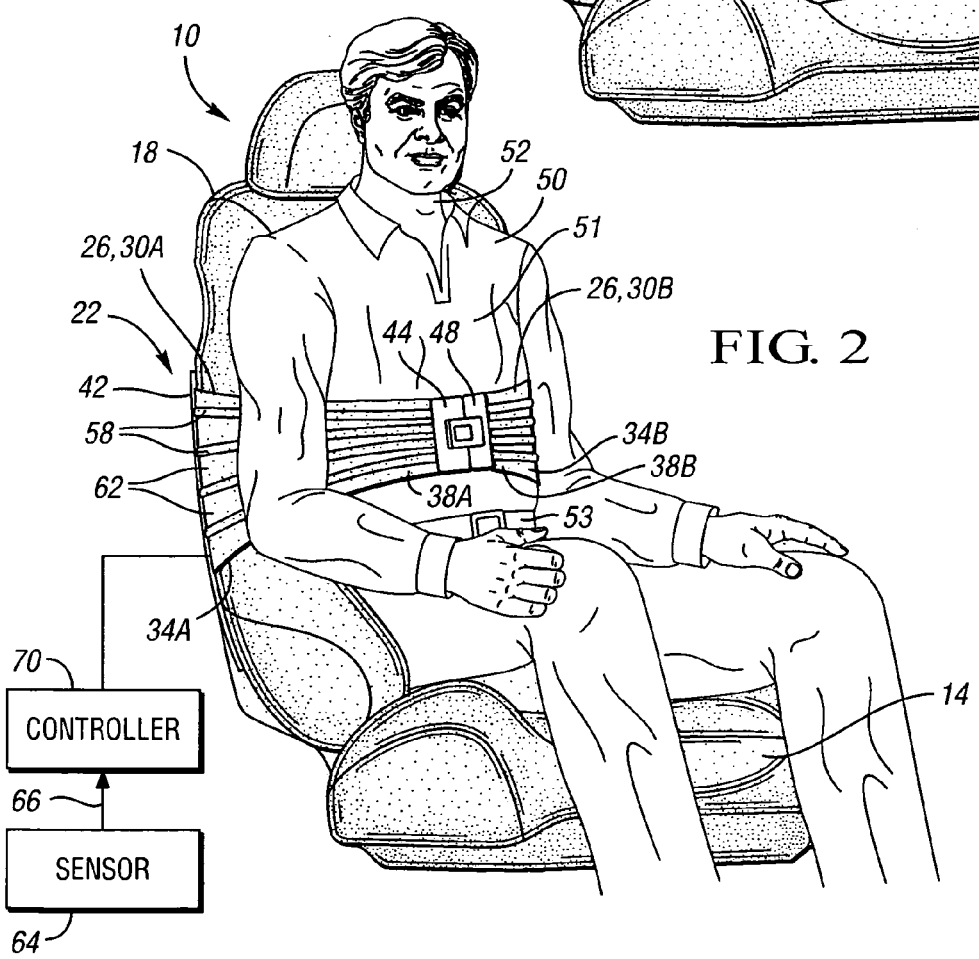
FIG. 2 is a schematic perspective view of the vehicle seat and seat belt of FIG. 1 with the seat belt engaged across an occupant of the seat and in a contracted condition.

A buckle 44 is connected to the narrow end 38A of segment 30A, and a tongue member 48 is connected to the narrow end 38B of segment 30B. The tongue member 48 is releasably engageable with the buckle 44 to operatively connect the two webbing segments 30A, 30B. Referring to FIG. 2, wherein like reference numbers refer to like components from FIG. 1, the buckle 44 and the tongue member 48 are engaged so that the webbing 26 restrains an occupant 50 of the seat 10 by extending across the torso 51 of the occupant between, but not including, the occupant's neck 52 and pelvis 53. However, other seat belt configurations, such as a three-point or four-point seat belt configuration, may be used within the scope of the claimed invention. Seat belt retractors (not shown) in the seatback portion 18 may be employed to allow selective extension and retraction of segments 30A, 30B.

Referring to FIGS. 1 and 2, the segments 30A, 30B in the embodiment depicted are approximately the same length. The webbing 26 includes a plurality of ribs 58 comprised of a first material (shown at 60 in FIG. 3) covered by an optional, protective, elastic second material (shown at 61 in FIG. 3). Ribs 58 are spaced a distance apart from one another, and are interconnected by a third material 62 such as a polyester or nylon mesh. The first material 60 is sufficiently configured to selectively effect a shape or dimensional change in the webbing in response to activation signals. The webbing 26 is shown in a contracted condition in which the ribs 58 are characterized by a first size. Referring specifically to FIG. 3, wherein like reference numbers refer to like components from FIGS. 1 and 2, webbing 26 is characterized by thickness $t_1$ and height $H_1$. The webbing 26 is spaced a distance from the torso 51 of the occupant.

Referring again to FIG. 2, a sensor 64 is configured to monitor at least one vehicle condition or characteristic, and transmit sensor signals 66 that describe, or are indicative of, the vehicle condition or characteristic. A controller 70 is configured to receive sensor signals 66. Controller 70 is programmed to analyze the sensor signals 66 according to a predetermined algorithm, and to selectively generate activation signals in response to the existence of at least one predetermined condition, as indicated by the sensor signals 66. In an exemplary embodiment, the sensor 64 is an accelerometer configured to monitor vehicle acceleration, and the predetermined condition is the vehicle acceleration being less than or equal to a predetermined negative value. However, those skilled in the art will recognize a variety of sensors and predetermined conditions that may be employed within the scope of the claimed invention.

Figure 4:
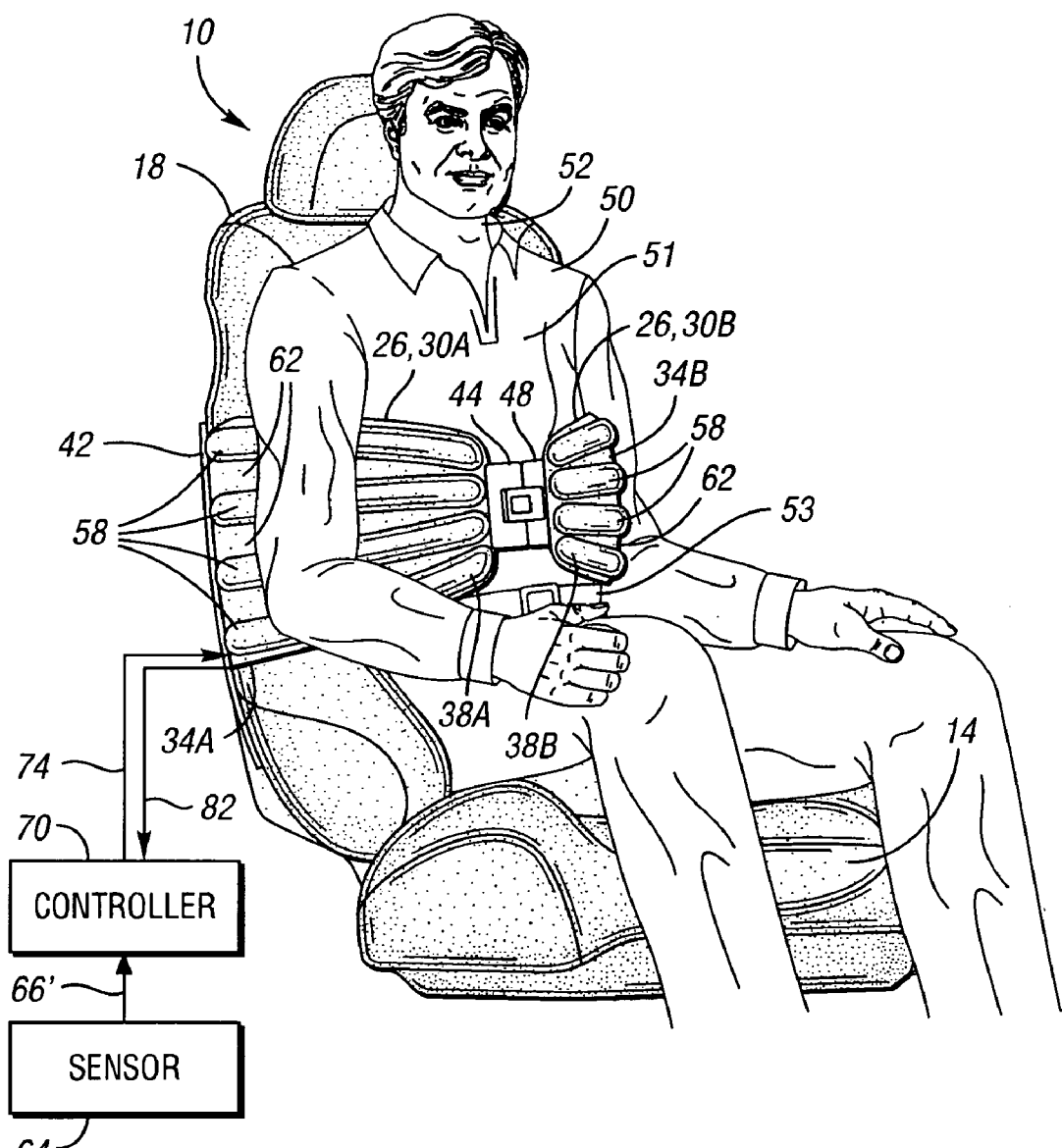
FIG. 4 is a schematic perspective view of the vehicle seat and seat belt with the seat belt in an expanded condition.

Referring to FIG. 4, sensor 64 transmits sensor signals 66' to controller 70 in response to the existence of the at least one predetermined condition. Controller 70 determines that the predetermined condition exists and, in response, the controller 70 causes the generation of activation signals 74 to which the first material is responsive to increase volume to a second size, with a corresponding change in webbing size and shape. The webbing 26 expands from the contracted condition to an expanded condition, as depicted in FIGS. 4 and 5. The webbing 26 in the expanded condition has a different size and shape from webbing in the contracted position, as shown in FIGS. 1-3.

With specific reference to FIG. 5, the webbing 26 is characterized by thickness $t_2$, which is greater than thickness $t_1$. By increasing thickness, the webbing functions as a pretensioner, closing the distance between the webbing 26 and the torso 51 of occupant 50. The webbing 26 is characterized by height $H_2$, which is greater than height $H_1$. By increasing in height, the webbing 26 provides increased surface area in contact with occupant torso 51. Ribs 58 are depicted having a circular cross section. However, the ribs and the first material 60 may, within the scope of the claimed invention, have any cross sectional shape. For example, it may be desirable for the first material 60 to have a square or rectangular cross section so that the webbing 26 presents a flat surface to the occupant's torso 51.

The first material 60 is depicted expanding radially. However, the material may also be configured to expand axially to effect a length change in the webbing 26 within the scope of the claimed invention. Furthermore, the interconnecting third material 62 is optional, and webbing may or may not be substantially entirely comprised of the first material within the scope of the claimed invention.

A sensor 78 on the webbing 26 is configured to transmit sensor signals 82 indicative of the size of occupant 50. More specifically, sensor 78 is configured to measure the force exerted on the webbing 26 by occupant 50, and transmit signals 82 indicative thereof to the controller. Referring again to FIG. 4, the controller 70 is configured to modulate the activation signals 74 in response to the sensor signals indicative of the size of the occupant, so that the rate at which the shape or dimensional change in the webbing is effected is dependent on the size of the occupant 50. Those skilled in the art will recognize other sensors that may be employed to generate signals indicative of the size of an occupant that may be employed within the scope of the claimed invention. For example, a sensor in the lower seat portion 14 may measure the weight of the occupant 50. When the predetermined condition no longer exists, the controller 70 causes the cessation of activation signals 74, and the webbing returns to the contracted condition as depicted in FIGS. 1-3.

In the embodiment depicted, the first material 60 is a solid material in a form that enables the webbing to be flexible. For example, the first material 60 may be in the form of fibers or wires. In a preferred embodiment, the first material 60 is a shape memory material that changes shape or size in response to an activation signal, such as a shape memory alloy. In another preferred embodiment, the first material 60 is a contractile polymer, such as artificial muscle fibers, which reversibly contracts and expands in response to chemical or electrical stimuli. Exemplary contractile polymers include polyaniline, polyacrylonitrile-polypyrrole (PAN-PPY), and polyvinylachohol (PVA) gel fibers. In the embodiment depicted, the stimulus is an electrical activation signal. Contractile polymers may also be characterized by abrupt volume changes in response to variations in external loading conditions. Advantageously, seat belt webbing comprising such a contractile polymer will contract with an equal and opposite response to a force exerted by an occupant against the webbing, with attendant pretensioning effects.

Alternatively, within the scope of the claimed invention, the ribs may be hollow, and configured for inflation with air or other fluids, in response to the controller transmitting an activation signal.

Referring again to FIG. 4, the ribs 58 are depicted as having a substantially uniform diameter along the lengths of segments 30A and 30B. However, it may be desirable for the diameter of the ribs 58 to vary along the lengths of segments 30A, 30B so that the ribs have a greater diameter at the narrow ends 38A, 38B than at the narrow ends 34A, 34B. It should be noted that a webbing extension (not shown) may be employed between the buckle 44 and the tongue member 48 to provide increased seat belt length for larger occupants. The webbing extension may or may not change in size or shape in response to the activation signals.

While the best modes for carrying out the invention have been described in detail, those familiar with the art to which this invention relates will recognize various alternative designs and embodiments for practicing the invention within the scope of the appended claims.

The invention claimed is:

1. A seat belt system for use by an occupant of a vehicle seat, the seat belt system comprising:
   seat belt webbing including a solid material sufficiently configured to selectively effect a shape or dimensional change in the webbing in response to an activation signal;
   a controller configured to selectively cause the generation of the activation signal to which the material is responsive; and
   at least one sensor configured to transmit sensor signals to the controller;
   wherein the controller is configured such that the size of the webbing is dependent on the sensor signals; and
   wherein the material is a shape memory material.

2. The seat belt system of claim 1, wherein the controller is configured to process the sensor signals to determine if at least one predetermined condition exists, and to cause the generation of the activation signal when the controller determines that said at least one predetermined condition exists.

3. The seat belt system of claim 1, wherein said at least one sensor is configured to transmit sensor signals indicative of the size of the occupant to the controller, and wherein the controller is configured so that the rate at which the shape or dimensional change is effected is dependent on the sensor signals indicative of the size of the occupant.

4. The seat belt system of claim 1, wherein the webbing includes a tapered portion having a wide end and a narrow end.

5. The seat belt system of claim 4, wherein the material is in the form of a plurality of ribs spaced a distance apart from one another, and wherein the distance between each of the ribs is greater at the wide end of the tapered portion than at the narrow end of the tapered portion.

6. The seat belt system of claim 1, wherein the webbing includes a first segment and a second segment, wherein the first segment and the second segment are tapered to each have a wide end and a narrow end, and further comprising a buckle connected to the narrow end of the first segment and a tongue member releasably engageable with the buckle and connected to the narrow end of the second segment.

7. A seat belt system for a vehicle comprising:

a vehicle seat occupiable by an occupant having a pelvis and a neck;

seat belt webbing having a plurality of ribs that are selectively expandable in response to an activation signal to effect a shape or dimensional change in the webbing, said seat belt webbing including a tapered portion having a wide end and a narrow end;

wherein said wide end of said webbing is adjustably mounted to a track, said track secured to a seatback portion of said vehicle seat, said track permitting said seat belt webbing to be selectively vertically adjustable relative to said seatback; and wherein the seat belt webbing is characterized by the absence of an over-the-shoulder portion.

8. The seat belt system of claim 7, wherein the distance between each of the ribs is greater at the wide end of the tapered portion than at the narrow end of the tapered portion.

9. The seat belt system of claim 7, wherein the ribs comprise solid material that is responsive to the activation signals.

10. A method for controlling the size or shape of seat belt webbing, the method comprising:

monitoring a state or condition; and causing a solid material shape in the seat belt webbing to effect a dimensional or shape change in response to a change in the monitored state or condition;

wherein the material is a shape memory material.

11. A seat belt system for an occupant of a vehicle, the seat belt system comprising:

seat belt webbing including a contractile polymer that is sufficiently configured to contract in response to a force exerted by the occupant on the seat belt webbing.

12. A seat belt system for use by an occupant of a vehicle seat, the seat belt system comprising:

seat belt webbing including a solid material sufficiently configured to selectively effect a shape or dimensional change in the webbing in response to an activation signal;

a controller configured to selectively cause the generation of the activation signal to which the material is responsive;

at least one sensor configured to transmit sensor signals to the controller; and at least one occupant size sensor secured on said seat belt webbing, said sensor configured to transmit signals indicative of size of the occupant to said controller;

wherein the controller is configured such that the size of the webbing is dependent on the sensor signals; and wherein the controller is configured to process the sensor signals to determine if at least one predetermined condition exists, and to cause the generation of the activation signal when the controller determines that said at least one predetermined condition exists.

13. The seat belt system of claim 12, wherein said controller is configured to modulate said activation signal in response to said occupant size sensor signals, wherein said modulated activation signal effects a rate at which said shape or dimensional change occurs.

14. A seat belt system for use by an occupant of a vehicle seat, the seat belt system comprising:

seat belt webbing including a solid material sufficiently configured to selectively effect a shape or dimensional change in the webbing in response to an activation signal;

wherein the webbing includes a tapered portion having a wide end and a narrow end;

wherein the material is in the form of a plurality of ribs spaced a distance apart from one another, wherein the distance between each of the ribs is greater at the wide end of the tapered portion than at the narrow end of the tapered portion; and wherein said wide end of said webbing is adjustably mounted to a track, said track secured to seatback portion of said vehicle seat, said track permitting said seat belt webbing to be selectively vertically adjustable relative to said seatback.

15. The seat belt system of claim 14, wherein the webbing includes a first segment and a second segment, wherein the first segment and the second segment are tapered to each have a wide end and a narrow end, and further comprising a buckle connected to the narrow end of the first segment and a tongue member releasably engageable with a buckle and connected to the narrow end of the second segment.

* * * * *